US010202183B2

(12) United States Patent
McCarthy et al.

(10) Patent No.: US 10,202,183 B2
(45) Date of Patent: Feb. 12, 2019

(54) DEFORMABLE AIRCRAFT WINDOW (71) Applicant: PPG INDUSTRIES OHIO, INC., Cleveland, OH (US)

(72) Inventors: Dennis P. McCarthy, Owens Crossroads, AL (US); Calvin B. Blevins, Huntsville, AL (US); Caroline S. Harris, Pittsburgh, PA (US); George B. Goodwin, Cranberry Township, PA (US); YaBei Gu, Sylmar, CA (US)

(73) Assignee: PPG industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/451,857

(22) Filed: Aug. 5, 2014

(65) Prior Publication Data
US 2015/0047275 A1 Feb. 19, 2015

Related U.S. Application Data (60) Provisional application No. 61/862,679, filed on Aug. 6, 2013.

(51) Int. Cl.
B64C 1/14 (2006.01)
(52) U.S. Cl.
CPC .............. B64C 1/1492 (2013.01); B64C 1/14 (2013.01)
(58) Field of Classification Search
CPC ................................ B64C 1/1492; B64C 1/14
USPC .................................... 244/129.3, 129.4, 119
See application file for complete search history.

(56) References Cited

U.S. PATENT DOCUMENTS

| 2,187,057 | A | * | 1/1940 | Sauer | G02B 23/14 |
| | | | | | 396/386 |
| 2,473,616 | A | * | 6/1949 | Stephenson | 244/129.3 |
| 3,429,530 | A | * | 2/1969 | Hertel | 244/129.3 |
| 4,278,875 | A | * | 7/1981 | Bain | 219/522 |
| 4,308,316 | A | * | 12/1981 | Gordon | 428/336 |
| 4,497,700 | A | * | 2/1985 | Groth et al. | 204/192.27 |
| 4,793,108 | A | * | 12/1988 | Bain et al. | 52/208 |
| 4,933,227 | A | * | 6/1990 | Stewart | 427/192 |
| 5,965,853 | A | * | 10/1999 | Hornsey | 181/289 |
| 5,988,566 | A | * | 11/1999 | Meyer | 244/129.3 |
| 6,592,077 | B2 | * | 7/2003 | Uhlemann et al. | 244/129.3 |
| 6,736,352 | B2 | * | 5/2004 | Bladt et al. | 244/129.3 |
| 7,552,896 | B2 | * | 6/2009 | Coak | 244/129.3 |
| 8,033,505 | B2 | * | 10/2011 | Wieting | 244/129.3 |

(Continued)

FOREIGN PATENT DOCUMENTS

CN  201521225 U  7/2010
EP  0459704 A1  12/1991
(Continued)

OTHER PUBLICATIONS

PCT Search Report, PCT/US2014/049747, dated May 12, 2015.

*Primary Examiner* — Joshua K Ihezie
(74) *Attorney, Agent, or Firm* — Neil J. Friedrich (57) ABSTRACT

An aircraft window assembly (10) includes a first panel (12) having a first surface (14) and a second surface (16). In a first state in which there is no pressure difference between the first surface (14) and the second surface (16), the first panel (12) has a cross-sectional shape selected from planar, outwardly convex, or inwardly convex. In a second state in which there is a pressure difference between first surface (14) and the second surface (16), the first panel (12) has an outwardly convex cross-sectional shape.

14 Claims, 11 Drawing Sheets

(56) References Cited

U.S. PATENT DOCUMENTS

| | | | |
|---|---|---|---|
| 8,297,556 B2* | 10/2012 | Krahn | 244/129.3 |
| 2002/0033433 A1* | 3/2002 | Uhlemann et al. | 244/129.3 |
| 2003/0087048 A1* | 5/2003 | Chaussade et al. | 428/34 |
| 2003/0234322 A1* | 12/2003 | Bladt et al. | 244/129.3 |
| 2006/0057362 A1 | 3/2006 | Lin et al. | |
| 2006/0080914 A1 | 4/2006 | Wood et al. | |
| 2006/0270470 A1* | 11/2006 | de La Chapelle et al. | 455/575.5 |
| 2008/0078876 A1* | 4/2008 | Baggette et al. | 244/129.3 |
| 2008/0094840 A1* | 4/2008 | Wu | F21V 9/04 362/293 |
| 2009/0130349 A1* | 5/2009 | Alvarez | 428/34 |
| 2013/0095311 A1 | 4/2013 | Rukavina et al. | |
| 2013/0320143 A1* | 12/2013 | Chaumel et al. | 244/129.3 |
| 2014/0170417 A1* | 6/2014 | Kreitmair-Steck et al. | 428/412 |

FOREIGN PATENT DOCUMENTS

| | | |
|---|---|---|
| EP | 1526999 | 5/2005 |
| GB | 493503 | 10/1938 |
| WO | 2010144709 A2 | 12/2010 |
| WO | 2012/066254 A1 | 5/2012 |
| WO | 2012068264 A1 | 5/2012 |
| WO | 2013093784 A1 | 6/2013 |

\* cited by examiner

DEFORMABLE AIRCRAFT WINDOW

CROSS REFERENCE TO RELATED APPLICATION

This application claims priority to U.S. provisional patent Application No. 61/862,679, filed Aug. 6, 2013, which is herein incorporated by reference in its entirety.

BACKGROUND OF THE INVENTION

Field of the Invention

This invention relates generally aircraft windows and, more particularly, to deformable aircraft cabin windows providing improved aerodynamics and lower drag.

Technical Considerations

Aircraft cabin windows are typically made of stretched acrylic. The cabin windows are installed in a frame attached to the aircraft fuselage. Conventional cabin windows typically have a semi-cylindrical cross-section in which the curved outer surface matches the outer curvature of the aircraft fuselage to provide a smooth outer surface of the aircraft. This reduces drag and promotes the overall aerodynamics of the aircraft.

At low altitudes, such as during takeoff and landing operations, there is little difference between the aircraft cabin pressure (interior pressure of the aircraft) and the pressure outside of the aircraft (exterior or atmospheric pressure). So, the cabin window retains its aerodynamic semi-cylindrical curvature matching the fuselage curvature. However, when the aircraft is at higher flight altitudes and the interior cabin pressure is relatively higher compared to the pressure outside of the aircraft, the cabin window can bulge or bow outwardly due to the pressure differential. This causes the outer surface of the cabin window to extend beyond the curvature of the aircraft fuselage, which creates an undesirable aerodynamic drag on the aircraft. This increased drag translates into increased fuel costs and lower cruising speeds.

This cabin window bulging can be reduced by using relatively heavy and rigid glass windows, which are stronger and less susceptible to bulging than thinner acrylic windows, or by increasing the thickness of the acrylic window to increase its strength and reduce the bulging. However, both of these solutions result in an increased weight penalty, which translates into lower fuel efficiency.

Therefore, it would be desirable to provide an aircraft cabin window which reduces or eliminates at least some of the problems associated with conventional aircraft cabin windows. For example, it would be desirable to provide an aircraft cabin window that retains the light weight of conventional stretched acrylic aircraft cabin windows but that reduces the aerodynamic problems associated with conventional aircraft cabin windows.

SUMMARY OF THE INVENTION

A deformable aircraft window assembly comprises a first panel having a first surface and a second surface. In a first state in which there is no pressure difference between the first surface and the second surface, the first panel has a first cross-sectional shape. In a second state in which there is a pressure difference between the first surface and the second surface, the first panel has an outwardly convex cross-sectional shape. The first cross-sectional shape of the first panel is selected from planar, outwardly convex, and inwardly convex.

A second panel can be spaced from the first panel.

The first panel can be a cast polyurethane panel.

The first panel can comprise a bulbous peripheral edge configured to engage a receiver in a mounting frame.

The first panel can have a substantially rectangular peripheral cross-section, wherein the first panel engages a frame such that the outer surface of the first panel is offset from an outer contour of an aircraft fuselage.

The first panel can have a stepped peripheral edge configured to engage a mounting frame such that the outer surface of the first panel is offset from an outer contour of an aircraft fuselage.

The first panel and/or second panel can include at least one throughbore.

The first panel can include at least one cast mounting hole located adjacent a peripheral edge of the first panel.

The first panel can comprise an angled peripheral edge, wherein the angled peripheral edge engages a seal. The seal can be adhesively bonded to a frame. A flexible wire can be embedded in the seal.

The window assembly can include a peripheral gasket. An inner edge portion of the peripheral gasket can be embedded in the first panel and an outer peripheral edge portion of the gasket extends beyond the peripheral edge of the first panel.

The gasket can include at least one hole or throughbore in the inner edge portion of the gasket embedded in the first panel.

The gasket can include at least one mounting hole located in the outer edge portion of the gasket extending beyond the peripheral edge of the first panel.

A wire grid can be embedded in the first panel. The wire grid can comprise nano-wires.

The first panel can be an cuter panel and the second panel can be an inner panel.

A functional coating can be located on at least one surface of the first panel and/or the second panel.

The functional coating can be a solar control coating.

A protective coating can be located over the functional coating.

The window assembly can comprise a transparent, compressible material positioned between the first panel and the second panel.

The compressible material can be in contact with the first panel and the second panel such that there is no air gap between the first panel and the second panel.

The second panel can include a substantially flat outer surface or outer surface portion. An electrochromic assembly can be located on the outer surface ore outer surface portion of the second panel.

The first panel can have a thickness variation across a width of the first panel.

The window assembly can include a gradient coating located on at least one surface of the first panel.

The second panel can have a thickness variation across a width of the second panel.

The window assembly can include a gradient coating located on at least one surface of the second panel.

In one aspect, the first panel has a planar first cross-sectional shape.

In another aspect, the first panel has an outwardly convex first cross-sectional shape.

In a still further aspect, the first panel has an inwardly convex cross-sectional shape.

In one aspect, the second panel has a planar first cross-sectional shape.

In another aspect, the second panel has an outwardly convex first cross-sectional shape.

In a still further aspect, the second panel has an inwardly convex cross-sectional shape.

BRIEF DESCRIPTION OF THE DRAWINGS

The invention will be described with reference to the following drawing figures wherein like reference characters identify like parts throughout.

DESCRIPTION OF THE PREFERRED ASPECTS

As used herein, spatial or directional terms, such as "left", "right", "inner", "outer", "above", "below", "top", "bottom", and the like, relate to the invention as it is shown in the drawing figure. It is to be understood that the invention can assume various alternative orientations and, accordingly, such terms are not to be considered as limiting. All numbers expressing dimensions, physical characteristics, processing parameters, quantities of ingredients, reaction conditions, and the like, used in the specification and claims are to be understood as being modified in all instances by the term "about". All ranges disclosed herein are to be understood to encompass the beginning and ending range values and any and all subranges subsumed therein. All documents, such as but not limited to, issued patents and patent applications, referred to herein are to be considered to be "incorporated by reference" in their entirety. The term "film" refers to a region of a coating having a desired or selected composition. A "layer" comprises one or more "films". A "coating" or "coating stack" is comprised of one or more "layers". The term "over" means "on or above". For example, a coating layer "formed over" a substrate does not preclude the presence of one or more other coating layers located between the formed coating layer and the substrate. The terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nanometers (nm) to 780 nm. The terms "infrared region" or "infrared radiation" refer to electromagnetic radiation having a wavelength in the range of greater than 780 nm to 100,000 nm. The terms "ultraviolet region" or "ultraviolet radiation" mean electromagnetic energy having a wavelength in the range of 100 nm to less than 380 nm.

The present invention relates to aircraft cabin windows (window assemblies) of the type that are normally used in commercial aircraft. The invention comprises, consists of, or consists essentially of the following features, in any combination.

Figures 1, 2:
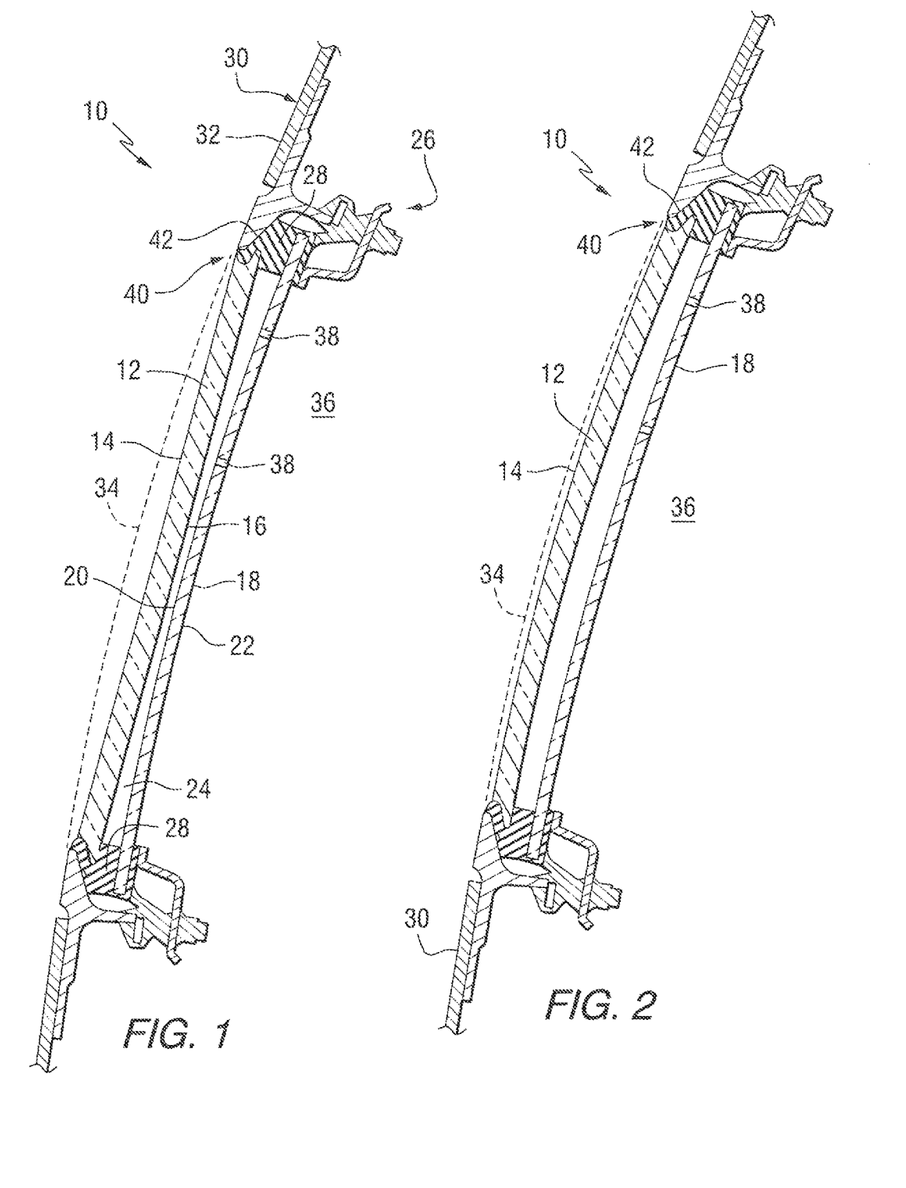
FIG. 1 is side, sectional view of an aircraft window assembly of the invention in a first state.
FIG. 2 is a side, sectional view of the window assembly of FIG. 1 in a second state.

As shown in FIG. 1 an aircraft window assembly 10 comprises a transparent first panel 12 (outer panel) having a first surface 14 (outer surface) and a second surface 16 (inner surface). The assembly 10 may include an optional second panel 18 (inner panel) spaced from the first panel 12 and having a third surface 20 (outer surface) and a fourth surface 22 (inner surface). In the aspect shown in FIG. 1, an air gap 24 is present between the first panel 12 and the second panel 18. The peripheries of the first panel 12 and second panel 18 are fitted within a mounting arrangement, such as a frame 26. An elastomeric seal 28 is located around the periphery of the assembly 10. The assembly 10 is mounted on an aircraft having a fuselage 30 with an outer surface 32 defining an outer fuselage contour 34 (shown in dashed lines in FIG. 1).

When the aircraft is in service and flying at a cruising altitude, the cabin 36 of the aircraft is pressurized. The first panel 12 is designed to withstand the pressure difference between the relatively higher pressure inside of the aircraft cabin 36 and the lower pressure outside the aircraft at high altitudes. In the aspect shown in FIGS. 1 and 2, to allow the first panel 12 rather than the second panel 18 to handle this pressure differential, one or more small holes 38 are provided through the second panel 18 to equalize the pressure between the air gap 24 and the aircraft cabin 36.

In the aspect shown in FIG. 1, the first panel 12 of the window assembly 10 has a flat configuration (i.e., planar or substantially planar cross-sectional shape) when there is no or substantially no difference between the pressure in the cabin 36 and the pressure exterior to the aircraft (i.e., an unpressurized or "first" state). By "planar" cross-section is meant that the panel 12 lies in a single plane when viewed in cross-section. In this first state, the first panel 12 is closer to the second panel 18 at or near the central region (medial region) of the assembly 10 than at the peripheral edges of the assembly 10. The outer surface 14 of the first panel 12 is spaced from or offset from the defined fuselage contour 34, with this offset being greater in a central region of the first panel 12 than at the periphery of the first panel 12.

Alternatively, the first panel 12 can have an outwardly convex cross-section in the first state. By "outwardly convex" is meant that the medial portion of the first panel 12 extends further outwardly than the periphery of the first panel 12.

Alternatively still, the first panel 12 can have an inwardly convex cross-section in the first state. By "inwardly convex" is meant that the medial portion of the first panel 12 extends further inwardly than the periphery of the first panel 12.

The second panel 18 may also have a planar or substantially planar cross-sectional shape (like the first panel 12) in the first state. Alternatively, as shown in FIG. 1, the second panel 18 may have an outwardly convex cross-sectional shape in the first state. Alternatively still, the second panel 18 may have an inwardly convex cross-sectional shape in the first state.

As shown in FIG. 2, as the aircraft increases in altitude and the interior pressure in the cabin 36 increases with respect to the pressure exterior to the aircraft (from the first state to the second state), the first panel 12 deflects outwardly such that the contour of the outer surface 14 of the first panel 12 changes from the planar first profile in FIG. 1 to the outwardly convex second profile shown in FIG. 2. In the second profile, the outer surface 14 of the first panel 12 generally approaches or matches the defined contour 34 of the outer surface 32 of the fuselage 30.

As an alternative, the outer panel 12 can have an outwardly convex contour when in the unpressurized state, i.e. have a surface contour between a flat outboard contour and the curved (outwardly convex shape) shown in FIG. 2. In this second profile, the first panel 12 and the second panel 18 may have the same or substantially the same cross-section curvature.

In any case described above, when the aircraft cabin 36 is fully pressurized and the aircraft is at flight altitude, the outer surface 14 of the first panel 12 conforms or substantially conforms to the fuselage contour 34 of the aircraft. This improves the aerodynamics of the aircraft and promotes fuel efficiency.

The first panel 12 and/or the second panel 18 of the cabin window assembly 10 can be formed in a variety of processes and can be made from a variety of materials. For example, the first panel 12 and/or second panel 18 can be formed from an initially flat billet and formed to the required shape by a combination of pressing, heating, and/or stretching. It is also contemplated that the first panel 12 and/or the second panel 18 can be oversized and subsequently shaped and cut to a final desired peripheral configuration. The first panel 12 and/or second panel 18 can also be cast-to-shape so that little or no post-forming processing is required. By "cast-to-shape" is meant that the material for making the panel is poured or injected into a mold such that upon curing or cooling, the cast panel has the desired features already present (e.g., particular edge shape or holes) such that little or no additional manufacturing steps (such as milling, grinding, cutting, or drilling) are required. The cast panel is essentially in its final desired form for use in the window assembly.

Examples of suitable materials for the first panel 12 and/or the second panel 18 include, but are not limited to, plastic materials (such as acrylic polymers, such as polyacrylates; polyalkylmethacrylates, such as polymethylmethacrylates, polyethylmethacrylates, polypropylmethacrylates, stretched acrylic, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); glass, such as conventional soda-lime-silicate glass (the glass can be annealed, heat-treated, or chemically tempered glass); or combinations of any of the above. The first panel 12 and second panel 18 are preferably transparent to visible light. By "transparent" is meant having visible light transmission of greater than 0% up to 100%. Alternatively, one or both of the panels 12, 18 can be translucent. By "translucent" is meant allowing electromagnetic energy (e.g., visible light) to pass through, but diffusing this energy such that objects on the side opposite the viewer are not clearly visible.

Preferably, the first panel 12 and/or the second panel 18 are made of a transparent material that can be cast and/or formed to the final desired shape, such as but not limited to glass, acrylic, polycarbonate, polyurethane, or other plastics, such as the material made by PPG industries, Inc., under the trade name OPTICOR, which is a castable polyurethane material (described in U.S. Publication No. 2013/0095311 A1). In a preferred aspect, the first panel 12 is made from a cast polyurethane material. In a more preferred aspect, both the first panel 12 and the second panel 18 are made of a cast polyurethane material.

The first panel 12 preferably has a visible light transmittance of at least 50%, such as at least 60%, such as at least 70%, such as at least 80%.

The second panel 18 preferably has a visible light transmittance of at least 50%, such as at least 60%, such as at least 70%, such as at least 80%.

The window assembly 10 preferably has a visible light transmittance of at least 50%, such as at least 60%, such as at least 70%, such as at least 80%.

One method of configuring the first panel 12 so that it deflects outwardly the correct amount so that its outer surface 14 matches the aircraft outboard fuselage profile 34 when the aircraft cabin 36 is a pressurized is to vary the thickness of the first panel 12 to make it more or less rigid, as required. However, it is believed that varying the thickness may lead to optical distortion when viewing through the first panel 12. As a result, in another aspect, regardless of whether first panel 12 is initially inwardly convex (i.e. outwardly concave), flat, or outwardly convex (i.e. inwardly concave), the thickness of the first panel 12 remains substantially constant throughout the entire viewing area of the first panel 12.

In the aspect shown in FIGS. 1 and 2, the periphery of the first panel 12 is provided with a configured edge, e.g. a rabbeted edge 40, which is filled into a correspondingly shaped channel or groove 42 in the seal 28. This rabbeted edge 40 can be machined about the periphery of the first panel 12 after the first panel 12 has been shaped, e.g., bent, and, if required, cut to shape.

Figure 3:
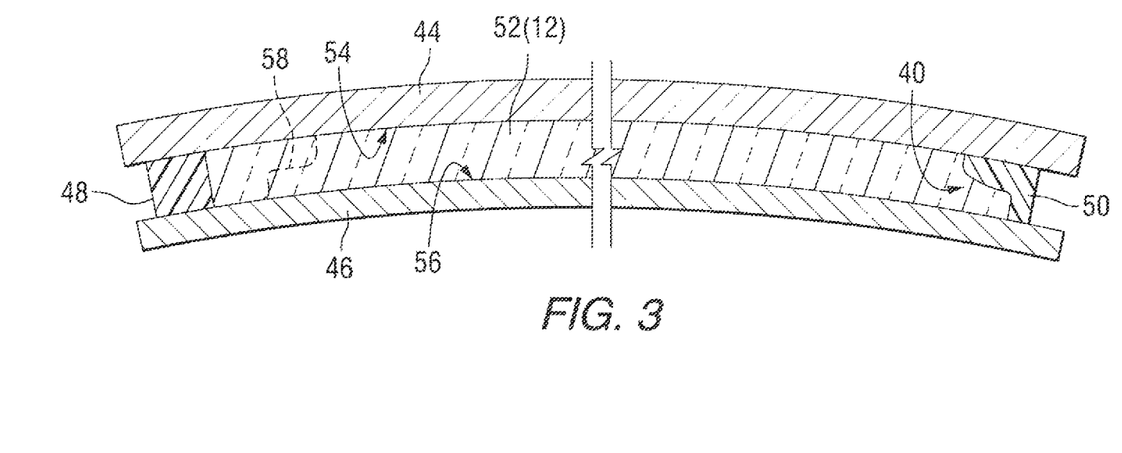
FIG. 3 is a side, sectional view of a casting mold for making an aircraft window panel of the invention.

Alternatively, as recited above, in one aspect of the invention, the first panel 12 is cast to shape. In this aspect, it is further contemplated that the rabbeted edge 40 can also be cast to a desired shape when casting the first panel 12, so that post forming processing of the first panel 12 is minimized. For example and referring to FIG. 3, upper and lower casting molds 44, 46, respectively, along with edge blocks 48, 50 form a cavity into which liquid polymer material 52 is poured, injected or otherwise fed into the cavity to cast the final desired shape of first panel 12. The inwardly directed faces 54, 56 of the casting molds 44, 46 can be made of metal, glass, or any other material that can impart smooth, undistorted surfaces on the opposing surfaces of first panel 12. The edge blocks 48, 50 can be a metal or elastomeric material. In the one aspect of the invention shown on the left-hand side of FIG. 3, the edge block 48 forms a straight edge along the periphery of the cast panel, which can be subsequently machined to a desired shape (for example as shown by dotted line 58). Alternatively, as shown on the right-hand side of FIG. 3, the edge block 50 can be shaped or configured to provide the final desired shape (e.g., rabbited edge 40) of the peripheral edge during casting of the first panel 12.

The second panel 18 can be made by the same or different method as the first panel 12.

The aspects of the invention discussed above and illustrated in FIGS. 1-3 show the first panel 12 as a monolithic ply, i.e. a single layer structure. It should be appreciated that the first panel 12 can also be a multilayered structure, i.e. include two or more plies. In one aspect of the invention, the first panel 12 is a laminate having two transparent plies secured together by a thermoplastic adhesive layer, e.g. polyvinyl butyral.

It is further contemplated that the first panel 12 of the present invention may include one or more coating layers (as described below) to provide additional functionality to the window assembly 10. For example, the outer surface 14 and/or the inner surface 16 of the first panel 12 can include an abrasion resistant coating or a UV and/or IR radiation reflecting coating.

Figure 4:
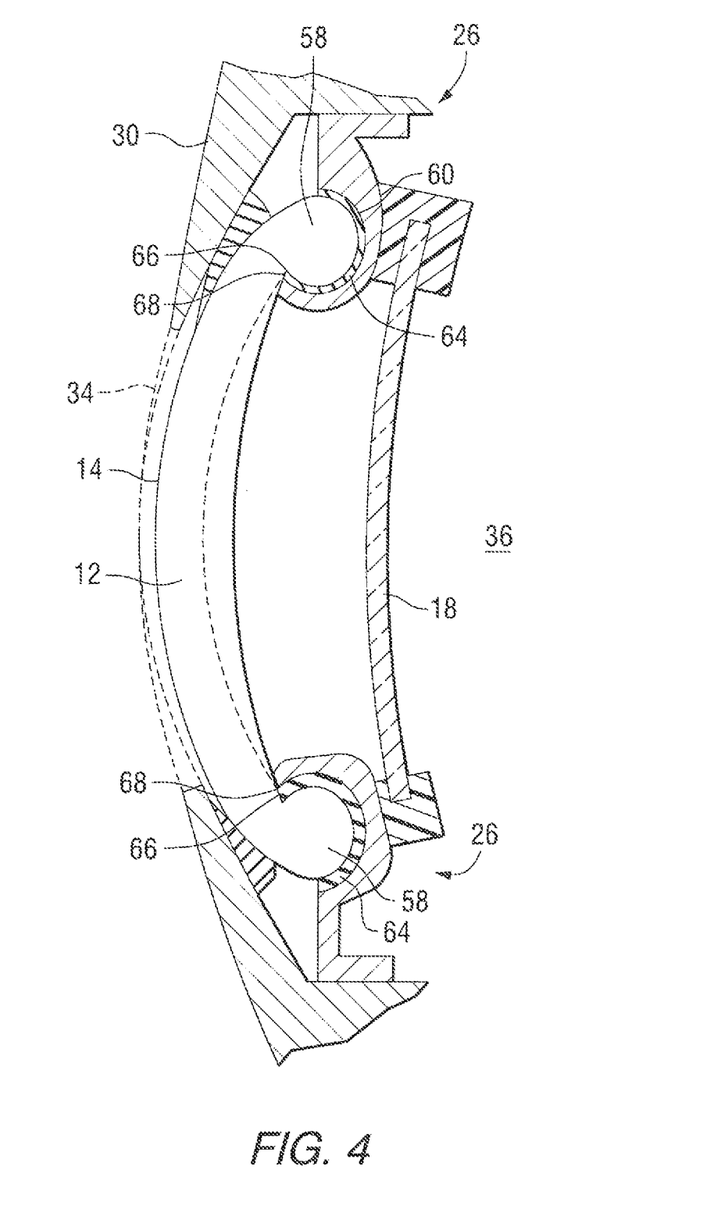
FIG. 4 is a side, sectional view of an aircraft window assembly of the invention mounted in a frame.

As shown in FIG. 4, the first panel 12 can include a specially formed curved peripheral edge 58 configured to engage a complementary-shaped receiver 60 in the frame 26. For example, the peripheral edge 58 can be a bulbous-shaped projection having an arcuate or partly spherical cross-section. The receiver 60 can be a curved groove or channel configured to receive or engage the bulbous projection to capture the peripheral edge 58 of the first panel 12 in the fixed frame 26 and hold the first panel 12 in place. A gasket 64 of compressible material can be located in the receiver 60. The shape of the peripheral edge 58 defines a notch or groove 66. The receiver 60 has an outer tip or projection 68 configured to engage the groove 66. The peripheral edge 58 and receiver 60 act as a conventional ball-and-socket joint to hold the first panel 12 in place. In FIG. 4, the first panel 12 is illustrated as having an outwardly convex cross-sectional shape in the first state.

As the aircraft cabin 36 is pressurized, the first panel 12 begins to deflect outwardly. Unlike other mounting arrangements in which the peripheral edge of the panel can slide within a peripheral gasket, in the mounting and support arrangement shown in FIG. 4, the periphery of the first panel 12 is fixed in place by the frame 26. This results in the first panel 12 going into tension as it deflects and the outer surface 14 deflecting outwardly. This tension load resulting from the fixed position of the peripheral edge 58 reduces the deflection of the first panel 12 towards the outboard aircraft profile 34. If desired, the first panel 12 and material can be selected such that the maximum outward deflection of the first panel 12 generally corresponds with, and in one aspect is essentially coplanar with, the outboard profile 34 of the aircraft fuselage 38.

As will be appreciated from FIG. 4, as the first panel 12 deflects outwardly, the bulbous peripheral edge 58 can twist in the receiver 60. However, the projection 68 engaged in the groove 66 helps to maintain the first panel 12 connected to the frame 26.

Figures 5, 6, 7:
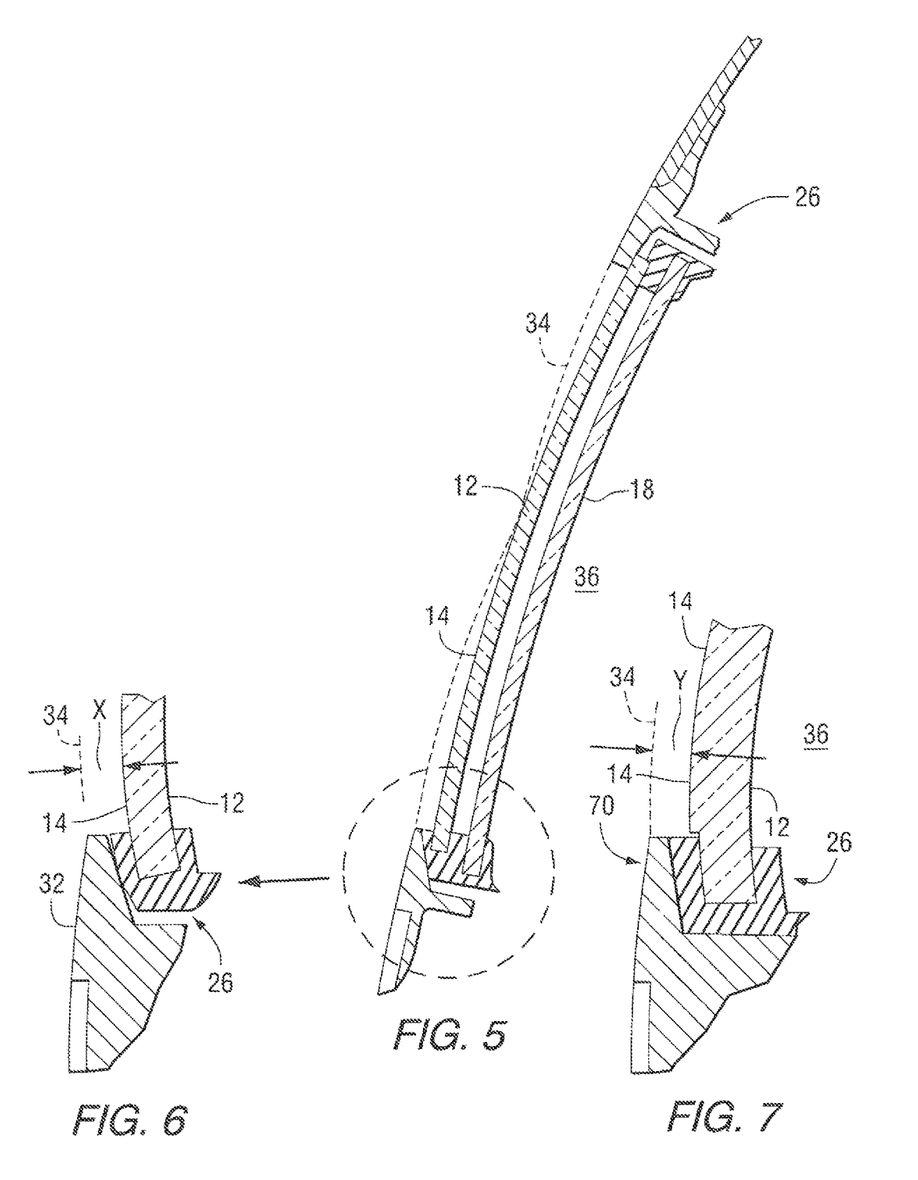
FIG. 5 is a side, sectional view of an aircraft window assembly of the invention mounted in a frame using an offset mounting configuration.
FIG. 6 is a detailed view of the lower portion of the aircraft window assembly of FIG. 5.
FIG. 7 is a side, sectional view of the lower portion of an aircraft window assembly similar to FIG. 6 but with an alternative offset mounting configuration.

In the aspect of the invention shown in FIGS. 5 and 6, the first panel 12 is manufactured without a shaped peripheral edge (e.g., rabbited edge 40 or curved peripheral edge 58 described above). The frame 26 is configured and the first panel 12 is installed into the aircraft such that the outer surface 14 of the first panel 12 is not coplanar with the outboard profile 34 of the aircraft fuselage 30 when the aircraft is not pressurized (first state). The peripheral edge of the first panel 12 is offset from outboard profile 34 of the aircraft fuselage 32 by a distance "X". When the aircraft is in service at cruising altitude and the cabin 36 is pressurized, the first panel 12 deflects outwardly, with the central portion generally aligned and essentially coplanar with the aircraft outboard profile 34 to reduce the wind drag on the aircraft. The outer surface 14 at the periphery of the first panel 12 remains offset from the aircraft outboard profile 34 at or near the periphery of the first panel 12.

It is appreciated that due to the offset X of the first panel 12 at or near the periphery that is maintained during deflection of the first panel 12, eddy currents are created in this peripheral region of the first panel 12. To reduce wind drag due to these currents and referring to FIG. 7, an alternate aspect of the first panel 12 can be provided with a stepped or rabbeted edge 70. This edge arrangement results in the first panel 12 periphery being installed in the aircraft with an offset of "Y", which is less than the offset X shown in FIG. 6. As discussed earlier, the outer surface 14 of the first panel 12 is configured and the first panel 12 is installed into the aircraft such that the outer surface 14 would not be coplanar with the outboard profile 34 of the aircraft fuselage 32 when the aircraft is not pressurized, with the peripheral edge of the first panel 12 being offset from the outboard profile 34 of the fuselage 32 by a distance Y. When the aircraft is in service and the cabin 36 is pressurized, the central portion of the first panel 12 deflects outwardly to a position generally aligned and essentially coplanar with the aircraft outboard fuselage profile 34. The periphery of the first panel 12 remains offset from the aircraft outboard profile 34 due to the rabbeted edge 70. However, the offset of the first panel 12 periphery shown in FIG. 7 is reduced as compared to FIG. 6, thus reducing the eddy currents created in this peripheral region of the first panel 12, and reducing the accompanying wind drag on the aircraft.

Figure 8:
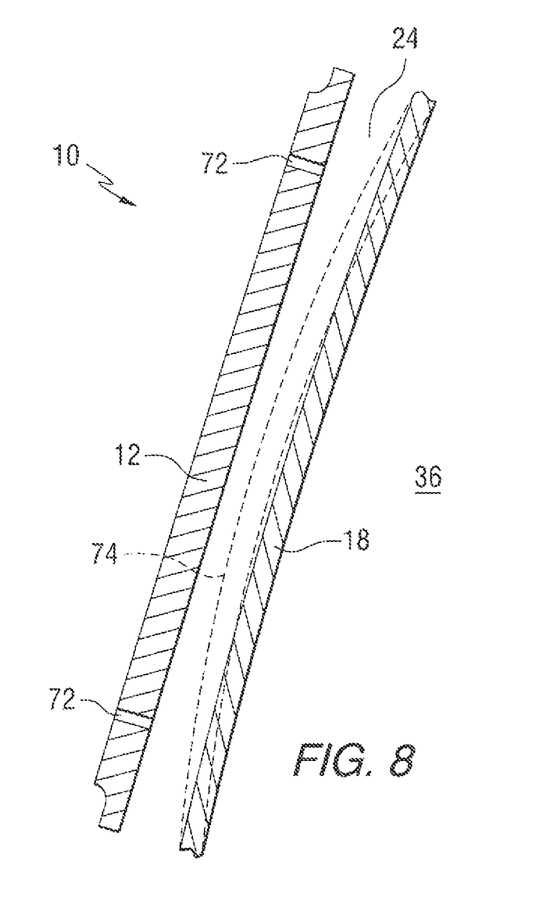
FIG. 8 is a side, sectional view of a further aspect of an aircraft window assembly of the invention.

FIG. 8 discloses an aspect of the aircraft window assembly 10 of the invention (the frame 26 is not shown for ease of discussion) in which the first panel 12 has one or more holes 72 and the second panel 18 does not have the holes 38 described in the above aspects. As will be appreciated, in this aspect the holes 72 provide for pressure equilibrium between the exterior of the aircraft and the air gap 24. Thus, the second panel 18, not the first panel 12, is the primary functional barrier between the cabin 36 and the exterior of the aircraft. In a pressurized state (second state), shown by dash lines 74 in FIG. 8, the second panel 18 deflects outwardly towards the first panel 12 due to the pressure difference between the interior and the exterior of the aircraft.

In the aspect shown in FIG. 8, the first panel 12 can be a rigid panel, such as glass, stretched acrylic, or cast polyurethane. The second panel 18 is a flexible panel, such as cast polyurethane, which in a relaxed or unpressurized state can be planar or substantially planar in cross-section, or can have an outwardly convex contour, or an inwardly convex contour.

Figure 9:
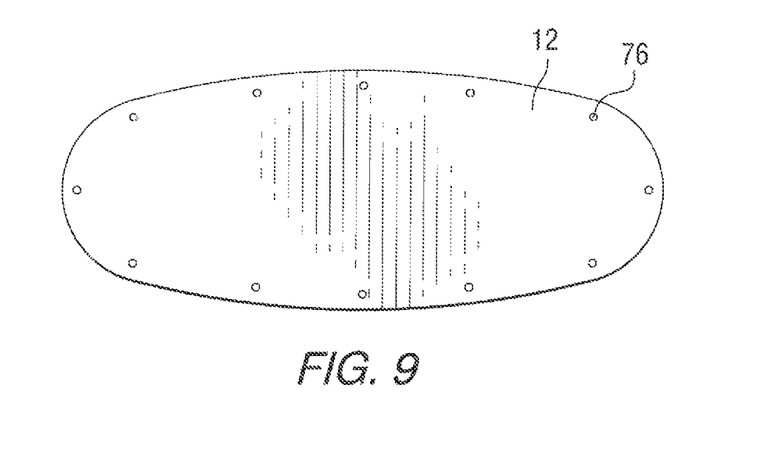
FIG. 9 is a plan view of an aircraft window of the invention.
Figure 10:
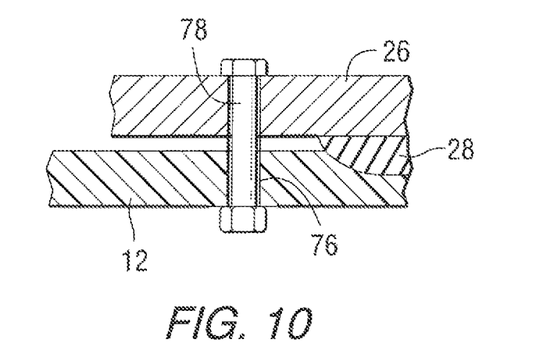
FIG. 10 is a side, sectional view of a peripheral edge of the aircraft window of FIG. 9.

In the aspect shown in FIGS. 9 and 10, the first panel 12 is a cast polyurethane panel having a plurality cast mounting holes 76 located around the periphery of the panel. The mounting holes 76 can be used to attach the first panel 12 to the frame 26, such as by inserting bolts 78 or other fasteners through the mounting holes 76 to mount the first panel 12 to the frame 26.

Figure 11:
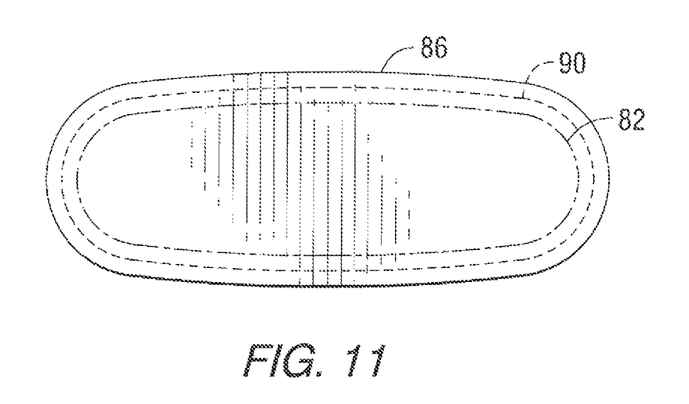
FIG. 11 is a plan view of an aircraft window of the invention having an outer seal.
Figure 12:
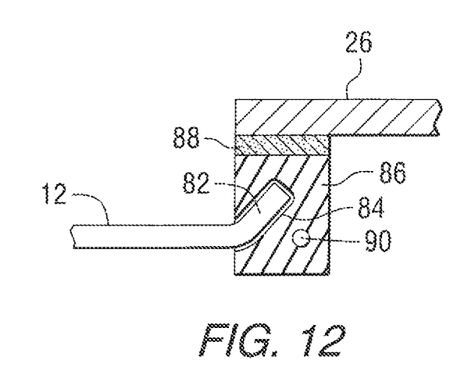
FIG. 12 is a side, sectional view of a portion of the aircraft window of FIG. 11 mounted to an aircraft.

In the aspect shown in FIGS. 11 and 12, the first panel 12 includes an angled peripheral edge forming an angled projection 82 that engages a groove or channel 84 in a flexible sealing member 86 located around the outer periphery of the first panel 12. The sealing member 86 can be made of any conventional flexible material, such as polymers or rubber. In FIG. 12, the first panel 12 is shown attached to the frame 26 by an adhesive layer 88, such as a conventional glue or other suitable adhesive, to adhesively bond the sealing member 86 to the aircraft or aircraft frame 26. The sealing member 86 can include a flexible metal wire 90 embedded in the seal material to allow for easier removal of the first panel 12 from the frame 26. For example, an end of the wire 90 can stick out of the sealing member 86. To remove the first panel 12 from the frame 26, this outer end of the wire 90 can be pulled. As the wire 90 is pulled, this breaks the sealing member 86 and allows the first panel 12 to be removed more easily.

Figure 13:
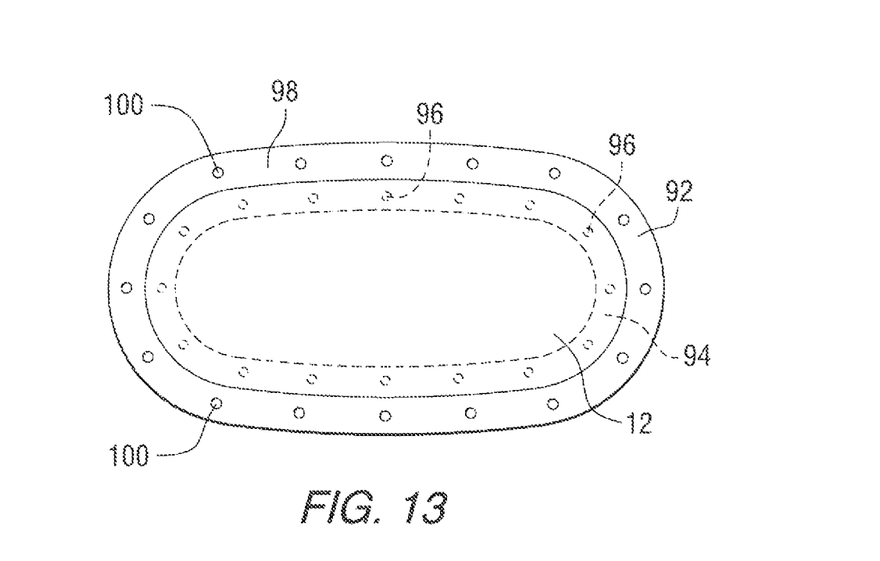
FIG. 13 is a plan view of an aircraft window of the invention incorporating a peripheral gasket.
Figure 14:
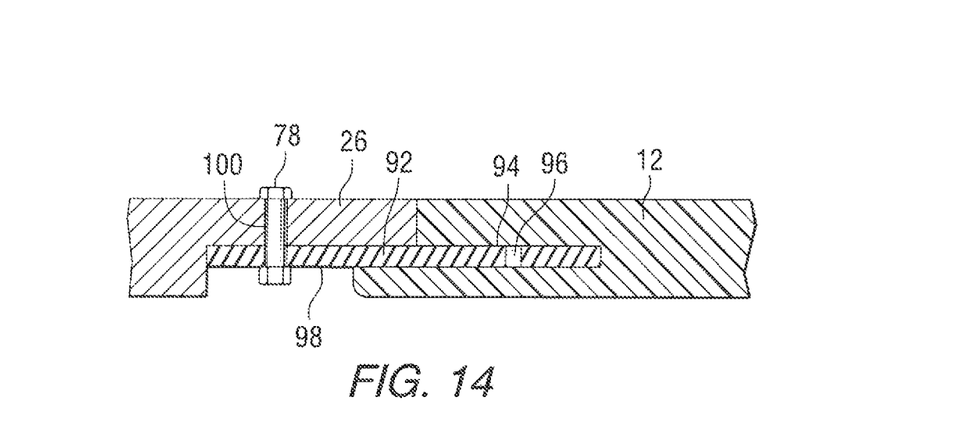
FIG. 14 is a side, sectional view of a peripheral edge of the window of FIG. 13 attached to a frame.

In the aspect shown in FIGS. 13 and 14, a gasket 92 is attached to or embedded in the first panel 12, for example around the outer periphery of the first panel 12. For example, when the first panel 12 is a cast polyurethane material, when the panel is cast, an inner edge portion 94 of the gasket 92 can be positioned such that the polyurethane material forms around and over this inner edge portion 94. The inner edge portion 94 of the gasket 92 is thus embedded in the first panel 12. The inner edge portion 94 can include a plurality of holes or throughbores 96 such that when the panel is cast, the polyurethane material flows into and through the throughbores 96 and solidifies in these throughbores 96 to anchor the inner edge portion 94 of the gasket 92 in the first panel 12 to help prevent the gasket 92 from being removed or pulled out of the first panel 12. An outer peripheral portion 98 of the gasket 92 can include a plurality of mounting holes 100 such that, as shown in FIG. 14, the first panel 12 can be connected to an aircraft or the frame 26 by inserting fastening members, such a bolts 78, through the mounting holes 100 to attach the gasket 92 to the frame 26 to hold the first panel 12 in place.

Figure 15:
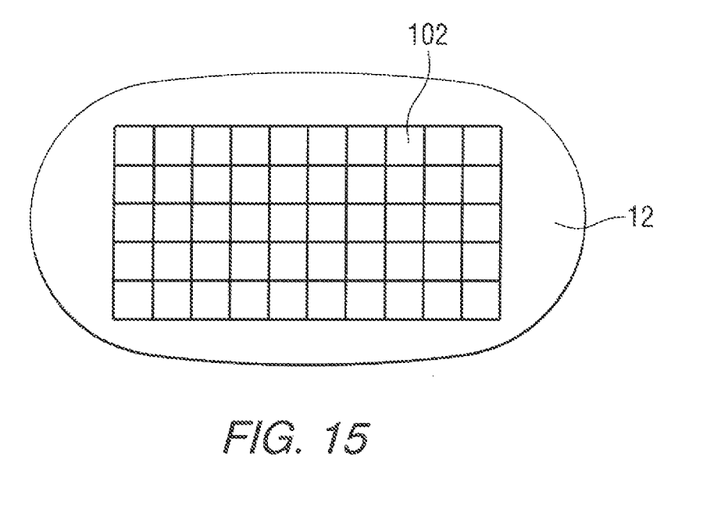
FIG. 15 is a plan view of an aircraft window of the invention incorporating a wire grid.
Figure 16:
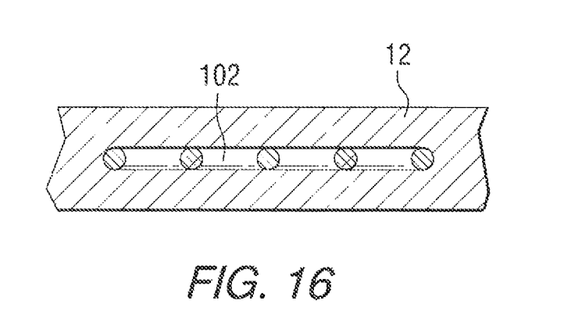
FIG. 16 is a side, sectional view of the aircraft window of FIG. 15.

As shown in FIGS. 15 and 16, the first panel 12 can also include a wire grid 102 positioned inside the first panel 12. This can be accomplished by casting the polyurethane material around the wire grid 102 such that the wire grid 102 is at least partially embedded in the first panel 12. This wire grid 102 can be, for example, nano-wires useful for electromagnetic pulse protection.

Figure 17:
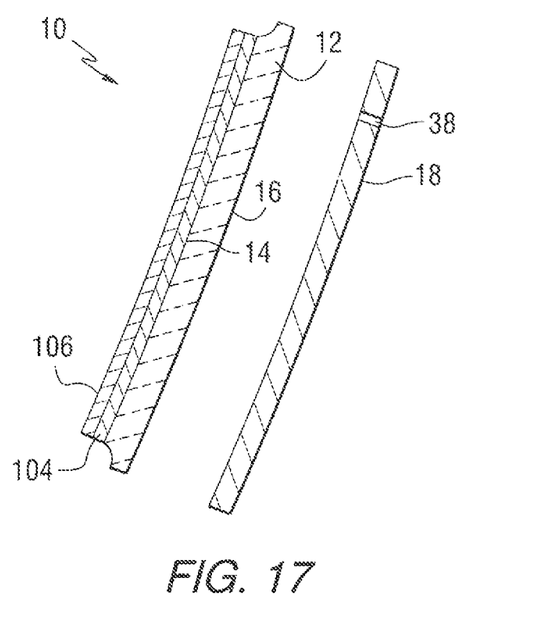
FIG. 17 is a side, sectional view of an aircraft window assembly of the invention (frame not shown) incorporating an outer coating.

In the aspect of FIG. 17, the first panel 12 can include at least one functional coating 104 on the outer surface 14 and/or the inner surface 16. The functional coating 104 can be, for example, a conductive coating; solar control coating having one or more infrared reflective metal layers; a protective coating, such as having one or more metal oxide layers, to provide mechanical and/or chemical protection; or an "emp" coating to provide protection against damage caused by an electromagnetic pulse.

A protective coating 106 can be placed over the functional coating 104 to protect the functional coating 104 from chemical and/or mechanical damage during flight. Examples of suitable protective coatings 106 include metal oxide coatings or polymeric coatings. One particularly suitable material is SOLGARD coating (made by PPG Industries, Inc.) Additionally or alternatively, the functional coating 104 (or another functional coating) can be located on the inner surface 16 of the first panel.

Figure 18:
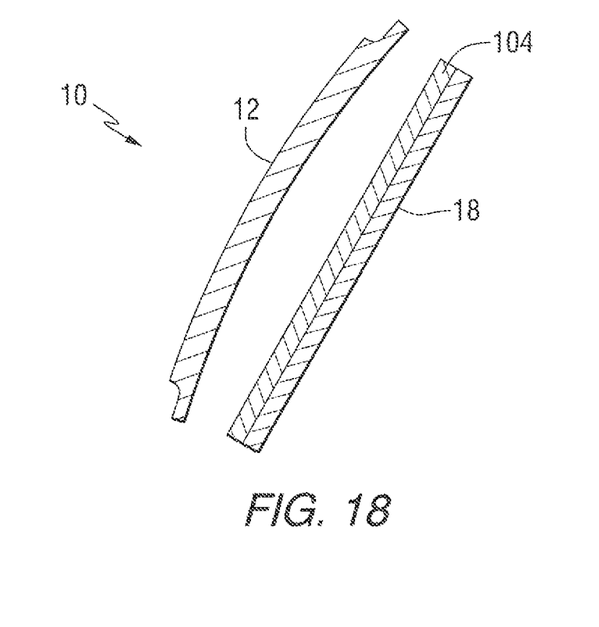
FIG. 18 is a side, sectional view of an aircraft window assembly of the invention (frame not shown) incorporating an inner coating.

FIG. 18 shows an aspect of the window assembly 10 of the invention having a functional coating 104 on the second panel 18. The functional coating 104 can be as described above.

Figure 19:
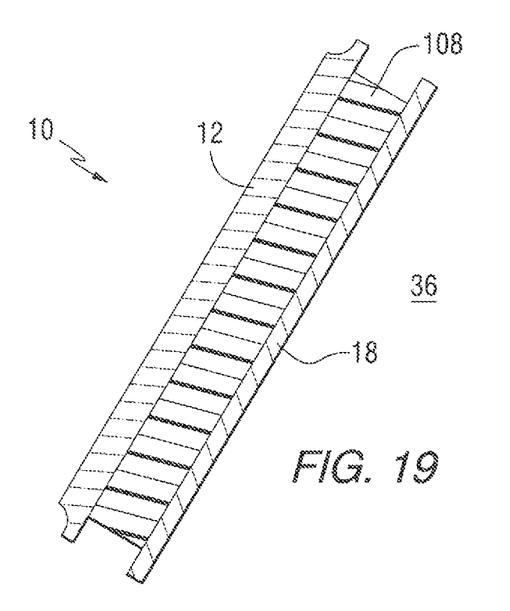
FIG. 19 is a side, sectional view of an aircraft window assembly of the invention (frame not shown) incorporating an intermediate compressible material.

FIG. 19 illustrates an aircraft window assembly 10 of the invention in which a compressible material 108 is positioned between the first panel 12 and the second panel 18. Thus, no air gap 24 is present between the first panel 12 and the second panel 18. When the aircraft cabin 36 is pressurized, the second panel 18 deflects outwardly and presses against the compressible material 108. The compressible material 108 absorbs at least some of this outward deflection of the second panel 18 to help reduce the outward deflection of the first panel 12.

The compressible material 108 is preferably a transparent material. Examples of suitable compressible materials 108 include transparent, compressible polymers. Particular examples include plastic materials such as acrylic polymers, urethane polymers, and vinyl polymers. One particular exemplary material is polyvinyl butyral.

Figure 20:
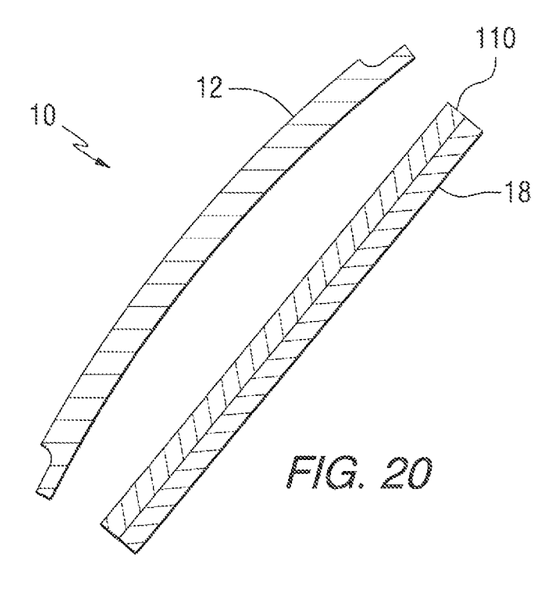
FIG. 20 is a side, sectional view of an aircraft window assembly of the invention (frame not shown) incorporating an electrochromic assembly.

FIG. 20 illustrates an aircraft window assembly 10 of the invention having an electrochromic assembly 110. In the illustrated aspect, the electrochromic assembly 110 is located on the second panel 18. The second panel 18 can have a planar cross-sectional shape in this aspect or at least a portion of the second panel 18, such as the central or medial portion of the second panel 18, can have a flat surface on which the electrochromic assembly 110 can be located. The electrochromic assembly 110 can be any conventional electrochromic device having a material that reversibly changes color (e.g., lightens and darkens) when an electrical potential is applied or removed.

Figure 21:
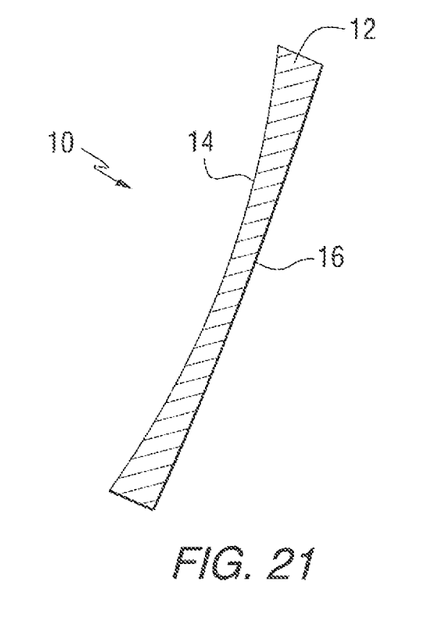
FIG. 21 is side, sectional view of an aircraft window of the invention incorporating a thickness variation across the width of the window.

FIG. 21 illustrates an aircraft window assembly 10 of the invention in which the first panel 12 has a thickness variation across a length or width of the panel. It is believed this thickness variation can help counteract the lensing effect caused by the deflection of the panels) 12, 18 of the aircraft window assembly 10. In the illustrated aspect, the first panel 12 is thicker at the periphery and thinner toward the center. Alternatively, the first panel 12 could be thinner at the periphery and thicker toward the center.

In a further aspect, the second panel 18 can have a thickness variation across a length or width of the panel, as described above with respect to the first panel 12. For example, the second panel 12 can be thicker at the periphery and thinner toward the center. Alternatively, the second panel 12 could be thinner at the periphery and thicker toward the center.

Figure 22:
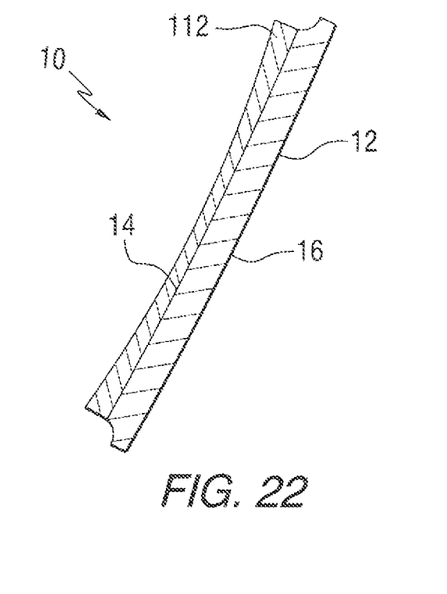
FIG. 22 is side, sectional view of an aircraft window of the invention incorporating a gradient coating.

FIG. 22 illustrates an aircraft window assembly 10 of the invention having a gradient coating 112 located on the first panel 12. In the illustrated aspect, the gradient coating 112 is located on the outer surface 14 of the first panel 12. This gradient coating 112 (or another gradient coating) could alternatively be located on the inner surface 16. The gradient coating 112 has a thickness variation across a length or width of the gradient coating 112. In the illustrated aspect, the gradient coating 112 is thicker at the periphery and thinner toward the center. Alternatively, the gradient coating 112 could be thinner at the periphery and thicker toward the center. This gradient coating 112 can help counteract the lensing effect caused by the deflection of the panel(s) of the aircraft window assembly 10.

In another aspect, a gradient coating 112 can be located on the third surface 20 and/or fourth surface 22 of the second panel 18. The gradient coating 112 can have a thickness variation across a length or width of the gradient coating 112. The gradient coating 112 can be thicker at the periphery and thinner toward the center. Alternatively, the gradient coating 112 could be thinner at the periphery and thicker toward the center.

It will be readily appreciated by those skilled in the art that modifications may be made to the invention without departing from the concepts disclosed in the foregoing description. Accordingly, the particular aspects described in detail herein are illustrative only and are not limiting to the invention which is to be given the full breadth of the appended claims and any and all equivalents thereof.

The invention claimed is:

1. A deformable aircraft window assembly, comprising:
   a cast-to-shape polyurethane first panel having an outwardly-facing first surface and a second surface, wherein in a first state in which there is no pressure difference between the first surface and the second surface the first panel has a first cross-sectional shape, and wherein in a second state in which a cabin of an aircraft is pressurized and the aircraft is at a cruising altitude so that there is a pressure difference between the first surface and the second surface, the first panel has an outwardly convex shape;
   a second panel spaced from the first panel; and
   a functional coating positioned on one or more of the first and the second surface of the first panel,
   wherein the functional coating comprises a gradient coating having a thickness that varies across a width of the gradient coating, such that the gradient coating is thicker at a periphery of the first panel and thinner toward a center of the first panel, the gradient coating being configured to counteract a lensing effect caused by deformation of the first panel when the first panel is in one or more of the first state and the second state,
   wherein the first cross-sectional shape of the first panel is selected from the group consisting of planar and outwardly convex, and
   wherein the first panel is an outer panel with an outer surface defining an outer fuselage contour when in the second state.

2. The window assembly of claim 1, wherein the second panel is a cast-to-shape polyurethane panel.

3. The window assembly of claim 1, wherein the first panel is configured to engage a frame such that the outer surface of the first panel is offset from an outer contour of an aircraft fuselage.

4. The window assembly of claim 1, wherein the first cross-sectional shape of the first panel is planar.

5. The window assembly of claim 1, wherein the first cross-sectional shape of the first panel is planar and the second panel has a planar cross-sectional shape.

6. The window assembly of claim 1, wherein the second panel includes at least one pressure equalization hole.

7. The window assembly of claim 1, wherein the first cross-sectional shape of one or more of the first panel and the second panel is planar.

8. The window assembly of claim 1, wherein a first cross-sectional shape of the second panel is inwardly convex.

9. The window assembly of claim 1, wherein the first panel comprises a cast-to-shape rabbeted edge engaging a groove in a seal.

10. The window assembly of claim 1, wherein the functional coating comprises a solar control coating comprising at least one infrared reflective metal layer.

11. The window assembly of claim 10, further comprising a protective coating over the solar control coating, wherein the protective coating is selected from the group consisting of a metal oxide coating and a polymeric coating.

12. The window assembly of claim 1, wherein the functional coating comprises at least one metal oxide layer.

13. The window assembly of claim 1, wherein the first panel comprises a cast-to-shape rabbeted edge and the functional coating further comprises at least one infrared reflective metal layer, the assembly further comprising:
   a seal having a groove, wherein the rabbeted edge of the first panel engages the groove; and
   a protective coating over the functional coating, wherein the protective coating is selected from the group consisting of a metal oxide coating and a polymeric coating.

14. A deformable aircraft window assembly, comprising:
   a cast-to-shape polyurethane first panel having an outwardly-facing first surface and a second surface, wherein in a first state in which there is no pressure difference between the first surface and the second surface the first panel has a planar cross-sectional shape, and wherein in a second state in which a cabin of an aircraft is pressurized and the aircraft is at a cruising altitude so that there is a pressure difference between the first surface and the second surface, the first panel has an outwardly convex shape;
   a second panel spaced from the first panel; and
   a functional coating positioned on one or more of the first and the second surface of the first panel,
   wherein the functional coating comprises a gradient coating having a thickness that varies across a width of the gradient coating, such that the gradient coating is thicker at a periphery of the first panel and thinner toward a center of the first panel, the gradient coating being configured to counteract a lensing effect caused by deformation of the first panel when the first panel is in one or more of the first state and the second state, and
   wherein the first panel is an outer panel with an outer surface defining an outer fuselage contour when in the second state.

* * * * *